United States Patent
Line et al.

(10) Patent No.: US 9,211,866 B1
(45) Date of Patent: Dec. 15, 2015

(54) SEATBELT AND ADJUSTABLE BUCKLE PRESENTER ASSEMBLY

(71) Applicant: Ford Global Technologies, LLC, Dearborn, MI (US)

(72) Inventors: Johnathan Andrew Line, Northville, MI (US); Scott Ferrier, Bloomfield Hills, MI (US); Benjamin Yilma, Canton, MI (US); Nahshon Francis, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/482,255

(22) Filed: Sep. 10, 2014

(51) Int. Cl.
*B60R 22/00* (2006.01)
*B60R 22/48* (2006.01)

(52) U.S. Cl.
CPC ...................................... *B60R 22/48* (2013.01)

(58) Field of Classification Search
USPC ............... 280/801, 801.1; 362/103, 108, 196, 362/191, 253, 806
See application file for complete search history.

(56) References Cited

U.S. PATENT DOCUMENTS

| | | | |
|---|---|---|---|
| 3,875,556 A | 4/1975 | Beaird | |
| 4,264,089 A | 4/1981 | Maekawa et al. | |
| 4,365,285 A * | 12/1982 | Brundidge | 362/488 |
| 5,149,189 A | 9/1992 | Kawamura | |
| 5,181,773 A * | 1/1993 | Colvin | 362/488 |
| 5,431,446 A | 7/1995 | Czarnecki et al. | |
| 5,892,436 A | 4/1999 | Blackburn et al. | |
| 6,102,440 A * | 8/2000 | Bergkessel | 280/808 |
| 6,473,947 B2 * | 11/2002 | Yun | 24/579.11 |
| 6,558,027 B2 * | 5/2003 | Ellis et al. | 362/483 |
| 6,598,899 B2 | 7/2003 | Stonich et al. | |
| 7,131,756 B2 * | 11/2006 | Leslie et al. | 362/488 |
| 7,347,579 B2 * | 3/2008 | Kohama et al. | 362/108 |
| 7,568,265 B2 * | 8/2009 | Kohama | 24/633 |
| 7,797,803 B2 * | 9/2010 | Falb et al. | 24/633 |
| 8,157,292 B2 * | 4/2012 | You et al. | 280/804 |
| 8,556,020 B2 | 10/2013 | Rodemer | |
| 2002/0002745 A1 | 1/2002 | Crawford et al. | |
| 2006/0080812 A1 * | 4/2006 | O'Brien et al. | 24/633 |
| 2007/0182534 A1 * | 8/2007 | Gregory | 340/457.1 |
| 2012/0089302 A1 | 4/2012 | Griffin | |

* cited by examiner

*Primary Examiner* — Toan To
(74) *Attorney, Agent, or Firm* — Vichit Chea; Price Heneveld LLP

(57) ABSTRACT

A seatbelt assembly includes a seatbelt buckle that is disposed along a retractable belt webbing and configured for tethered movement about a vehicle interior. The seatbelt buckle includes a housing which contains a latch mechanism which releasably latches a seatbelt tongue to the seatbelt buckle. The housing further includes one or more light sources powered through the belt webbing or through a power cell in the housing which are used to illuminate the vehicle interior as tethered to the vehicle on the belt webbing and which are further used to facilitate a vehicle occupant in locating the seatbelt tongue when fastening the seatbelt assembly.

20 Claims, 13 Drawing Sheets

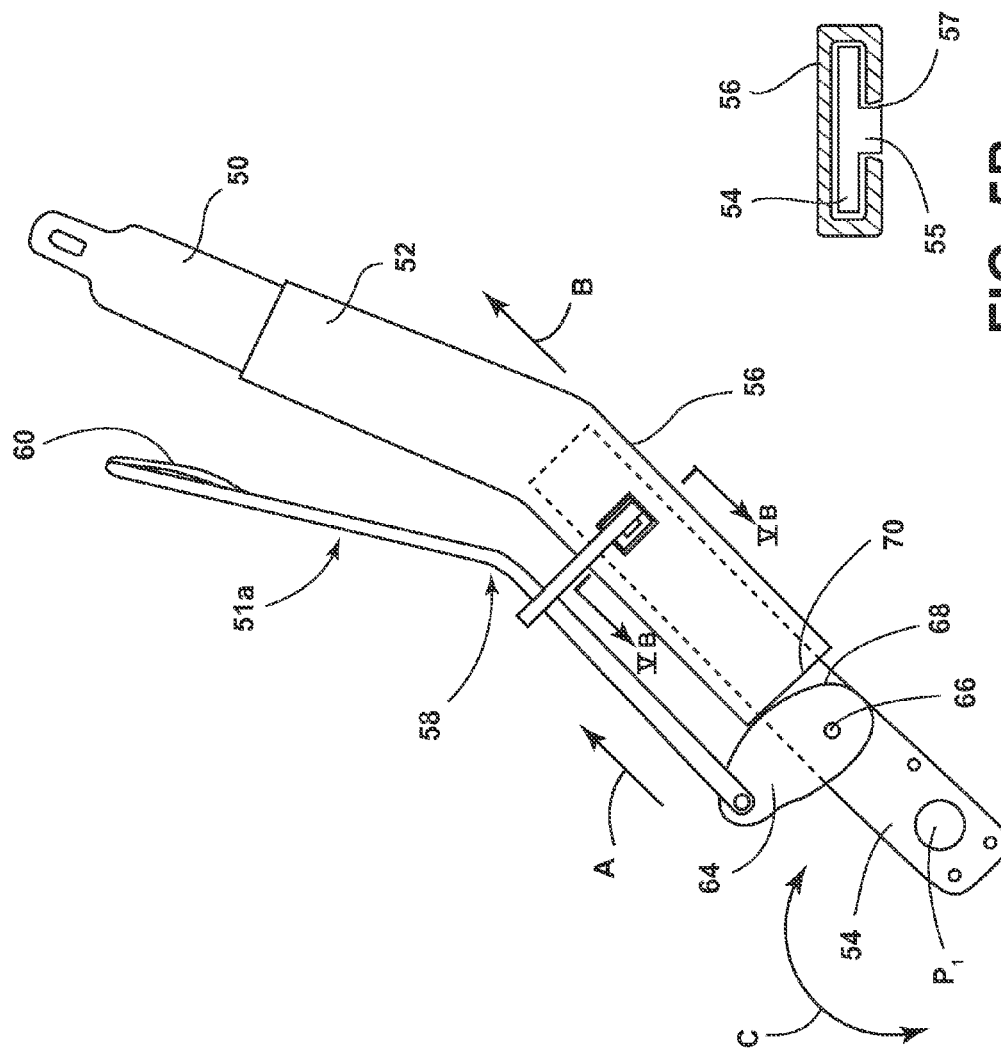

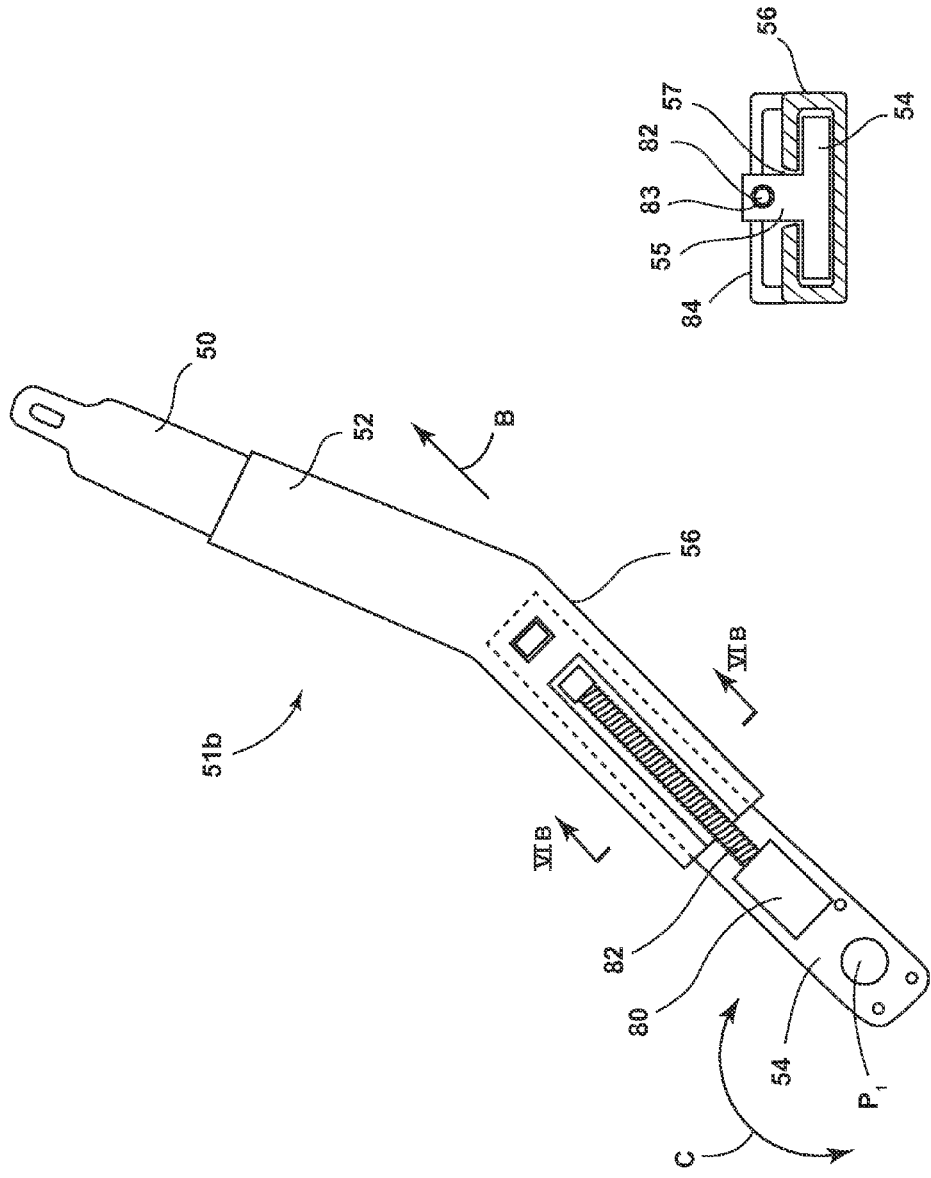

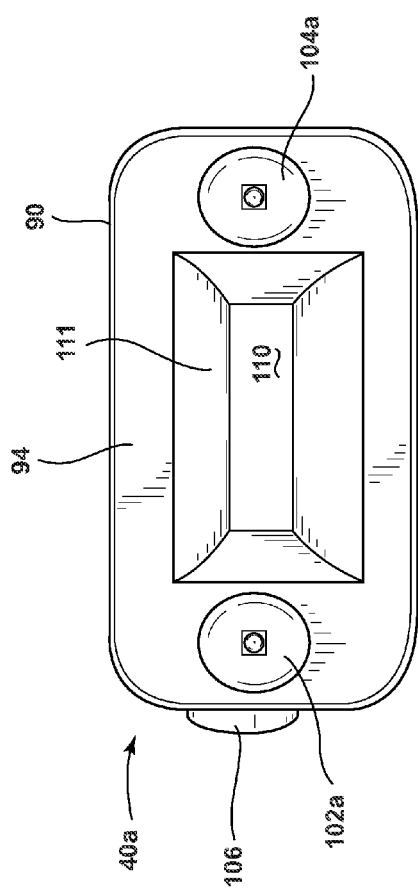
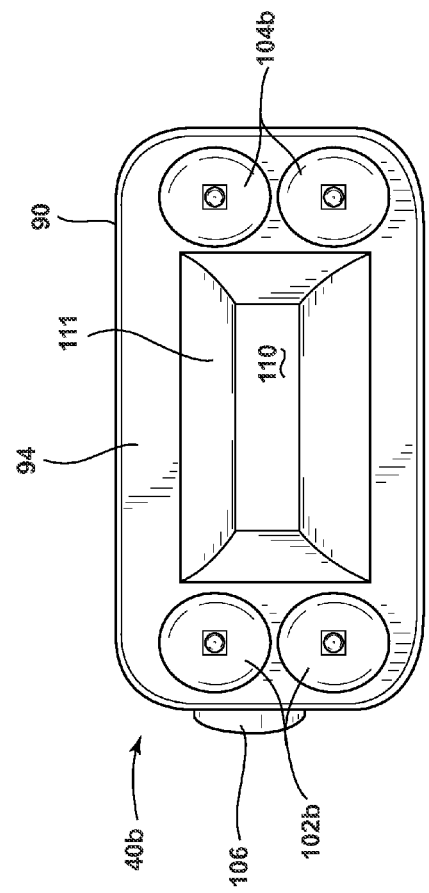
FIG. 9A
FIG. 9B

SEATBELT AND ADJUSTABLE BUCKLE PRESENTER ASSEMBLY

FIELD OF THE INVENTION

The present invention generally relates to a seatbelt assembly for use with a vehicle seat, and more particularly, to a seatbelt assembly having a buckle which is disposed on a seatbelt webbing and includes one or more light sources for illuminating particular portions of the vehicle interior including a seatbelt tongue for buckling the seatbelt assembly.

BACKGROUND OF THE INVENTION

In an automotive vehicle, the seatbelt buckle is generally disposed on a seatbelt mount that is fixed in length in relation to a vehicle seat. The seatbelt buckle can be coupled to a vehicle floor or may be coupled to a frame portion of a vehicle seat. The fixed length buckle in current seatbelt restraint systems may be difficult to locate when a vehicle seat is moved about on a vehicle seat track. Particularly, if the vehicle seat is moved upward and/or forward, a buckle having a fixed length may be difficult to locate and latch to by the vehicle occupant. Thus, the present invention seeks to provide a seatbelt restraint system that can deliver more value than traditional seatbelt restraint system designs have done in the past.

Referring now to FIG. 1, a seatbelt assembly 1 of the prior art is shown having seatbelt webbing portions 2a-2c which is configured to wind up within a retractor 4 disposed within a vehicle pillar trim 3. The seatbelt assembly 1 is shown with a vehicle seat 5 which is most likely a passenger seat in the embodiment shown in FIG. 1. A fixed length mount 6 includes a buckle 7 disposed at a distal end thereof. A tongue member 8 is operably coupled to the seatbelt webbing 2a and is configured to be received in the buckle 7 to secure a vehicle occupant in the vehicle seat 5. Referring now to FIG. 2, a similar vehicle seat 5a is shown with the seatbelt assembly 1 for use on the driver side of a vehicle. In the embodiment shown in FIG. 2, the seatbelt assembly 1 includes a standard tongue 8 and buckle 7 for restraining a vehicle occupant within the vehicle seat 5a. In both the embodiments shown in FIG. 1 and FIG. 2, the tongue 8 is releasably latched to the buckle 7 and is generally retained therein until the tongue 8 is released by the vehicle occupant unlatching the tongue 8 from the buckle 7 using a release button 9 disposed on the buckle 7 as shown in FIGS. 1 and 2. As further shown in FIG. 2, a retractor 4 is positioned near the vehicle seat 5a and may be enclosed within a pillar trim, or may be external to the pillar trim. Seatbelt webbing portion 2c is shown coupled to an anchor 4a, however, in certain known assemblies, this anchor 4a may be replaced with a second retractor, thereby providing a dual retractor system which is generally used with a fixed tongue assembly that is coupled to separate seatbelt webbings. In order to provide more value and utility from a seatbelt system, the present invention is designed to provide features that help facilitate a vehicle occupant in fastening or latching the seatbelt assembly, wherein the buckle and tongue are reversed from there general configuration within a seatbelt assembly, and each are provided with convenience features designed to enhance the experience of the vehicle occupant.

SUMMARY OF THE INVENTION

One aspect of the present invention includes a seatbelt assembly having a seatbelt buckle slidably disposed along a retractable belt webbing. The seatbelt buckle is coupled to the retractable belt webbing for movement about a vehicle interior. The buckle includes a housing containing a latch mechanism which releasably latches a seatbelt tongue to the buckle. A light source is disposed within the housing for illuminating the vehicle interior as the buckle moves thereabout.

Another aspect of the present invention includes a seatbelt assembly having a seatbelt buckle disposed on a belt webbing between first and second portions thereof. The buckle has a housing which contains a latch mechanism and a light source. The belt webbing defines an extendable tether between the buckle and a vehicle for movement about an interior of the vehicle. A seatbelt tongue is operably coupled to the vehicle and is configured to be releasably received in the latch mechanism of the buckle.

Yet another aspect of the present invention includes a seatbelt assembly having a seatbelt buckle disposed on a retractable belt webbing. The seatbelt buckle is configured for movement about an interior of a vehicle and includes a housing containing a latch mechanism. A light source is disposed within the housing for illuminating the vehicle interior from the buckle. A telescoping seatbelt tongue is coupled to the vehicle and is moveable between extended and retracted positions. The seatbelt tongue is configured to be releasably received in the latch mechanism of the buckle.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5A is a side elevational view of a telescoping seatbelt tongue having an actuation lever;

FIG. 5B is cross-sectional view of the seatbelt tongue of FIG. 5A taken at line VB;

FIG. 6A is a side elevational view of a telescoping seatbelt tongue configured for powered actuation;

FIG. 6B is cross-sectional view of the seatbelt tongue of FIG. 6A taken at line VIB;

FIG. 9A is a bottom view of a seatbelt buckle according to another embodiment;

FIG. 9B is a bottom view of a seatbelt buckle according to yet another embodiment;

DETAILED DESCRIPTION OF THE PREFERRED EMBODIMENTS

Figure 3:
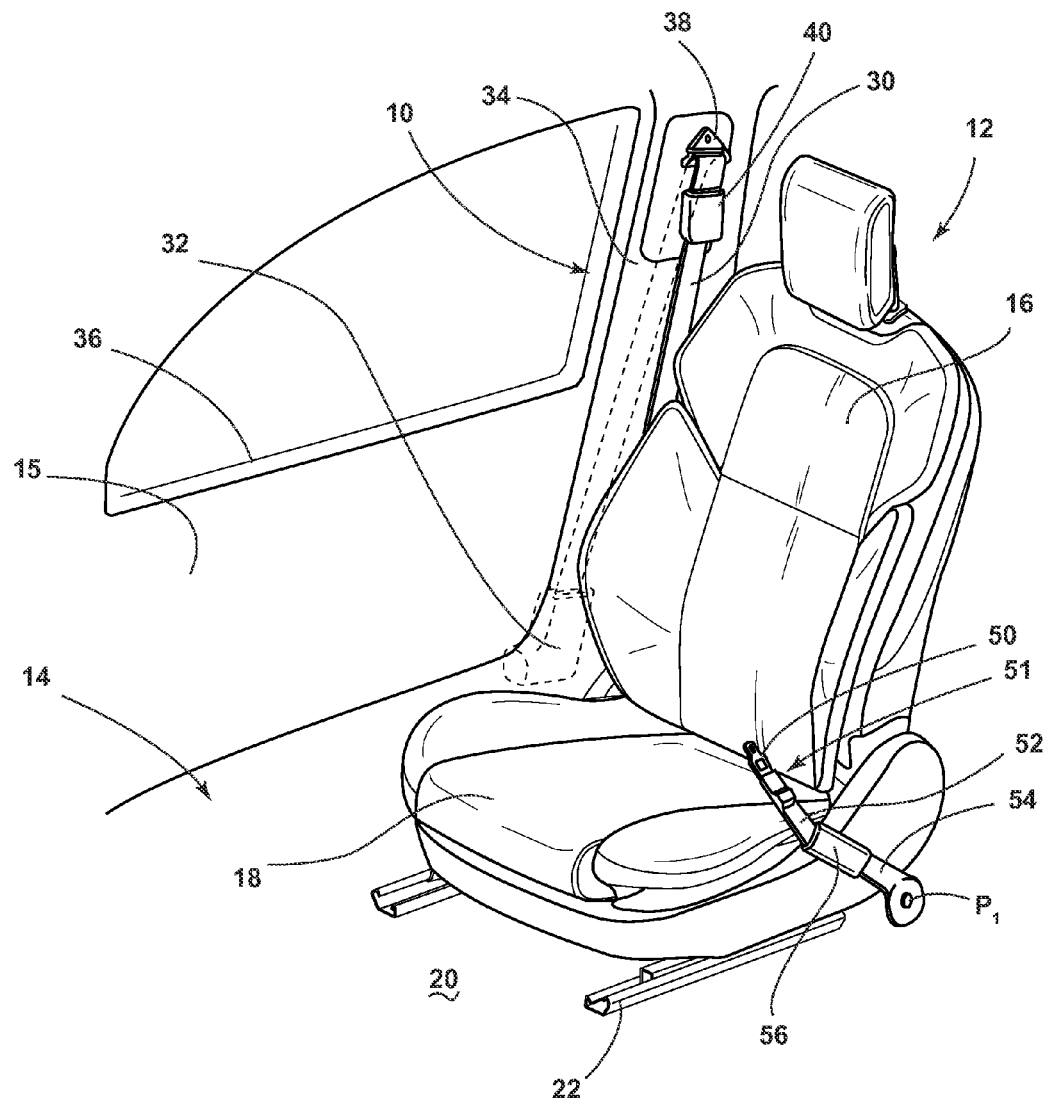
FIG. 3 is a perspective view of a passenger seat disposed within a vehicle interior with a seatbelt assembly in an unlatched condition according to one embodiment.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 3, the reference numeral 10 generally designates a seatbelt assembly as used with a vehicle seat 12 positioned within a vehicle interior 14 of a vehicle 15 on a passenger's side thereof. The vehicle seat 12 generally includes a seatback 16 pivotally coupled to a seat member 18. The seat member 18 is slidably coupled to a vehicle floor 20 along a seat track assembly 22. The seat track assembly 22 is configured to allow the vehicle seat 12 to be adjusted in forward and rearward directions within the vehicle interior 14. It is understood that the vehicle seat 12 may be positioned in various locations throughout the vehicle interior 14 other than the illustrated position, such as a driver's side location, a rear seat location, as well as a third row seat location. It is also conceivable that the seat member 18 may not be coupled to a track assembly, like seat track assembly 22, and alternatively may be fixedly coupled to the vehicle floor 20. The seatbelt assembly 10 is configured for use with a variety of vehicle seats and retractor systems.

Figure 1:
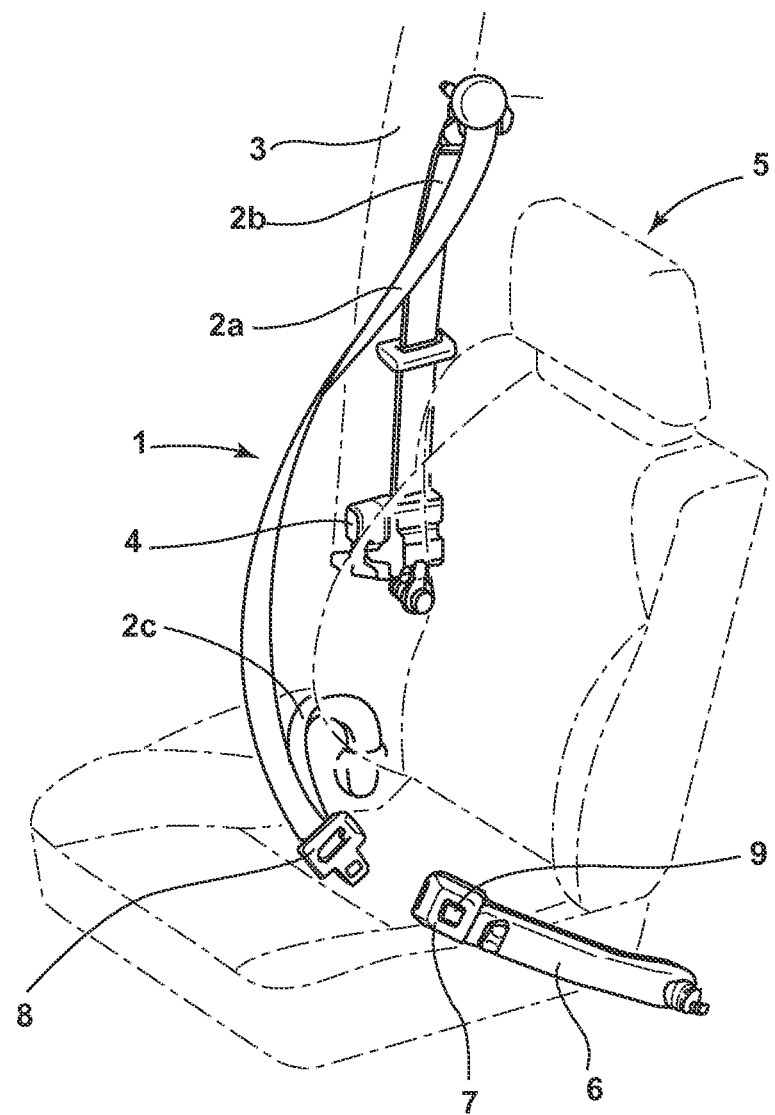
FIGS. 1 and 2 are perspective views of a vehicle seat having a seatbelt assembly of the prior art.
Figure 2:
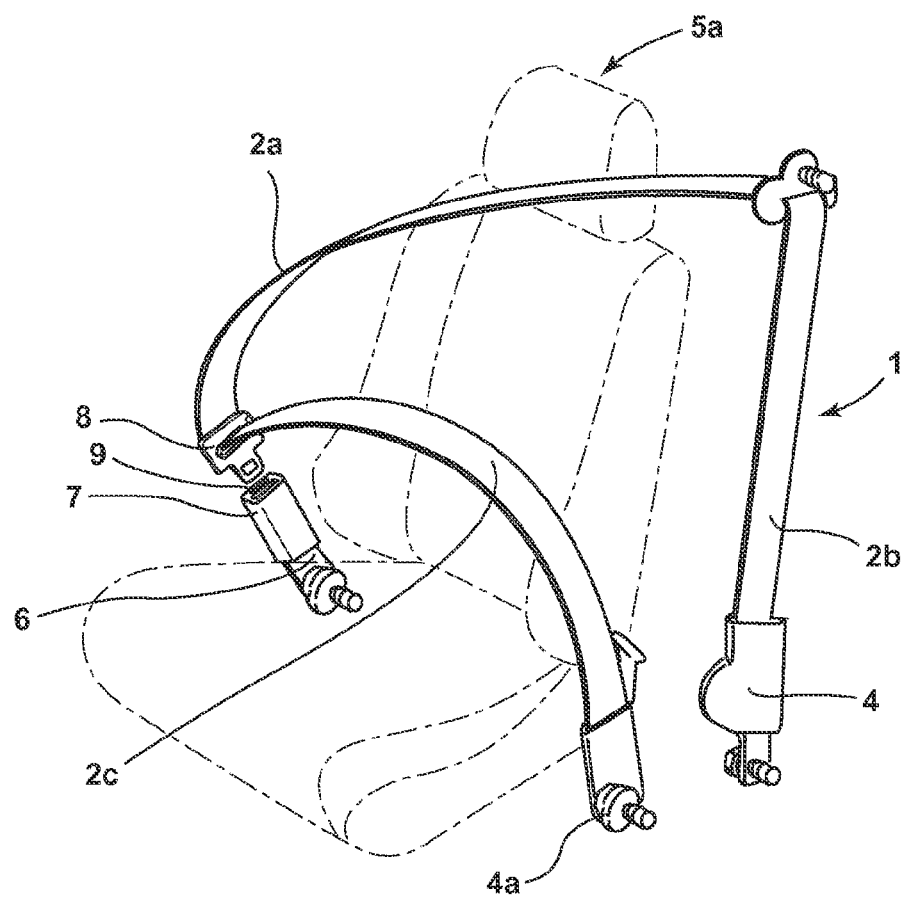

As shown in FIG. 3, the seatbelt assembly 10 includes a belt webbing 30 which is coupled to the vehicle seat 12 or the vehicle 15 at one end and further coupled to a retractor 32 disposed within a B-pillar 34 of the vehicle 15. The retractor 32 may also be located externally to the B-pillar 34 of the vehicle 15, and it is further contemplated that a separate belt webbing may be coupled to the vehicle seat 12 or the vehicle 15 using a second retractor in a dual retractor system. The B-pillar 34 is generally disposed between a front passenger door 36 and a rear passenger side door which is not shown in FIG. 3. As coupled to the retractor 32, the belt webbing 30 is a retractable belt webbing, thereby allowing a vehicle occupant to move a seatbelt buckle 40 within the vehicle interior 14 for latching the seatbelt assembly 10 as further described below. In the embodiment shown in FIG. 3, the belt webbing 30 is coupled to a stating ring 38, known in the industry as a D-ring or turning loop, which may be vertically adjustable along the B-pillar 34 for accommodating various vehicle occupants. The seatbelt buckle 40 is coupled to the belt webbing 30 and may be slidable along the belt webbing for adjustable movement therealong. The seatbelt buckle 40 may also be fixed on portions of the belt webbing 30, as in a dual retractor system, for example. The seatbelt assembly 10 of the present invention differs from known seatbelt assemblies, such as seatbelt assembly 1 shown in FIGS. 1 and 2, in that the seatbelt buckle 40 is coupled to the belt webbing 30, rather than a seatbelt tongue, such as seatbelt tongue 8 shown in the prior art iterations of FIGS. 1 and 2. As coupled to the vehicle seat 12 or vehicle 15 and the retractor 32, the belt webbing 30 defines an extendable tether on which the seatbelt buckle 40 is either adjustably of fixedly coupled. In this way, the seatbelt buckle 40 can be moved throughout the vehicle interior 14 for latching the seatbelt assembly 10 as well as for providing an interior light feature as further described below.

As further shown in FIG. 3, the seatbelt assembly 10 further includes a seatbelt tongue 50 disposed on a seatbelt tongue mount 51 which is operably coupled to either the vehicle 15 or the vehicle seat 12 in assembly. For the purposes of this disclosure, the seatbelt tongue mount 51 will be described as being coupled to the vehicle 15, which may include being coupled to the vehicle seat 12 for movement therewith. The seatbelt tongue 50 includes a bracket portion 52 and a mounting portion 54. The mounting portion 54 is pivotally coupled to the vehicle 15 at pivot point $P_1$. The mounting portion 54 and bracket portion 52 are operably coupled to one another at a translation portion 56 which provides for a telescoping feature as further described below.

Figure 4:
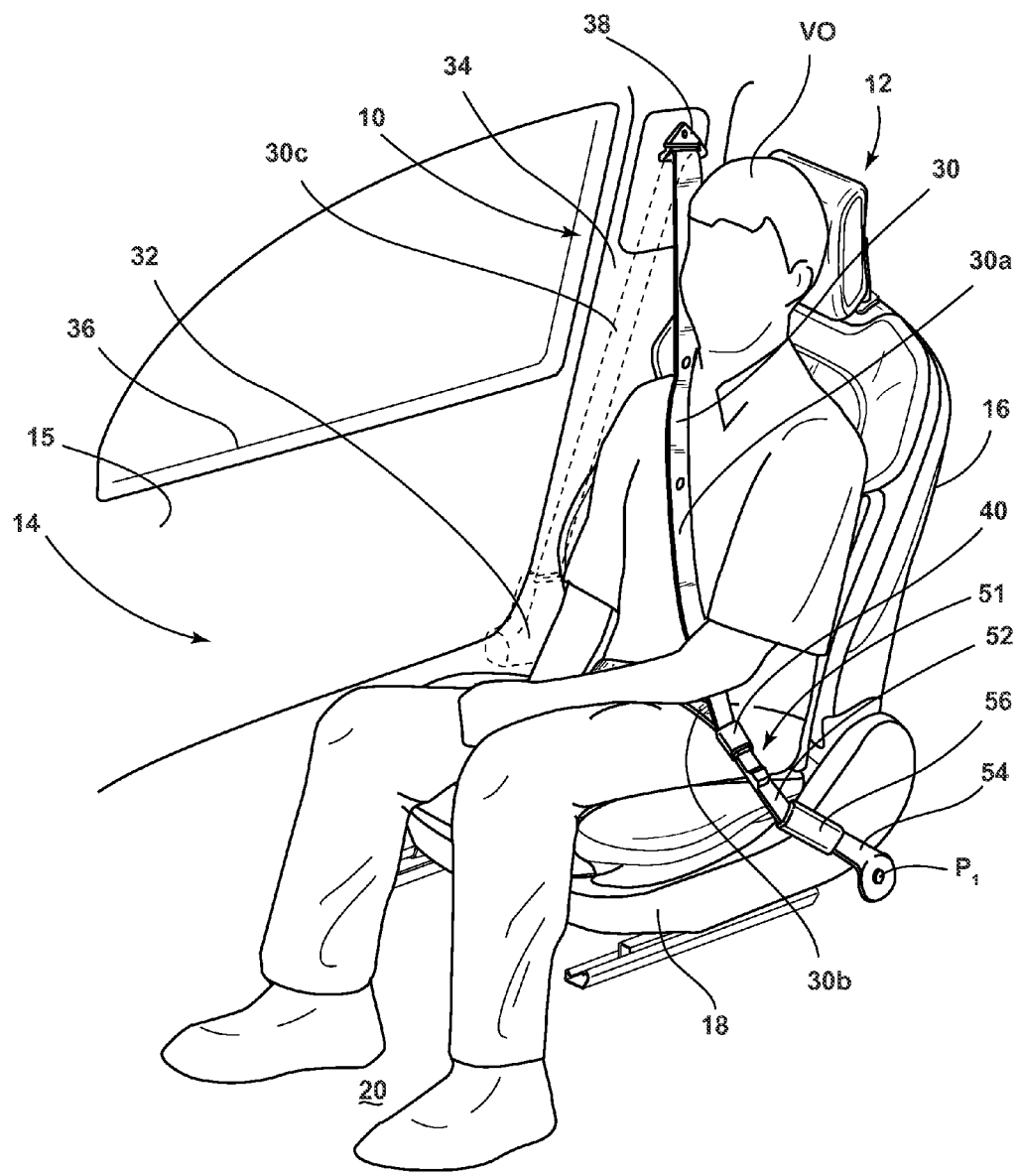
FIG. 4 is a perspective view of the vehicle seat and seatbelt system of FIG. 3, wherein the seatbelt assembly is in a latched condition with a vehicle occupant restrained in the vehicle seat.

Referring now to FIG. 4, a vehicle occupant VO is shown seated in vehicle seat 12 with the seatbelt assembly 10 fastened around the vehicle occupant VO. When the seatbelt assembly 10 is in the fastened or latched condition, as shown in FIGS. 4 and 7B, the seatbelt buckle 40 is latched to the seatbelt tongue 50 (shown in FIG. 3), such that the vehicle occupant VO is securely fastened or restrained within the vehicle seat 12. In the latched condition, the seatbelt assembly 10 provides for first and second portions 30a and 30b of the belt webbing 30. As shown, the first portion 30a crosses over the torso and abdomen of the vehicle occupant VO, while the second portion 30b is disposed across the lap of the vehicle occupant VO. A third portion 30c of the belt webbing 30 is disposed within the B-pillar 34 of the vehicle 15 and is coupled to the retractor 32, such that the belt webbing 30 is a retractable belt webbing that tethers the seatbelt buckle 40 to the vehicle 15.

Referring now to FIG. 5A, an embodiment of a seatbelt tongue mount 51a is shown having seatbelt tongue 50 disposed on bracket portion 52 which is coupled to mounting portion 54 at a translation portion 56. The seatbelt tongue mount 51a of FIG. 5A further includes a manual lever 58 having a handle portion 60 which is configured to be engaged by a vehicle occupant for moving the lever 58 in a direction as indicated by arrow A. The lever 58 is further coupled to a cam driver 64 at attachment location 62. The cam driver 64 is pivotally coupled to the mounting portion 54 of the seatbelt tongue mount 51a at attachment location 66. The cam driver 64 includes a cam surface 68 which is configured to abut an abutment wall 70 disposed on the translation portion 56 of the seatbelt tongue mount 51a. In this way, as the lever 58 is moved by the vehicle occupant in the direction as indicated by arrow A, the cam surface 68 of the cam driver 64 will engage abutment surface 70 of the translation portion 56 to telescopingly move the seatbelt tongue 50 in a generally upward and angled direction as indicated by arrow B. In this way, the seatbelt tongue mount 51a is a telescoping seatbelt tongue mount in that the seatbelt tongue 50 may telescopingly move in the direction as indicated by arrow B by actuation of the lever 58 by the vehicle occupant. Thus, the seatbelt tongue mount 51a includes mounting portion 54 which is received within the translation portion 56 for providing a telescoping feature for the seatbelt tongue 50, thereby making the seatbelt tongue mount 51a adjustable to provide greater access to the seatbelt tongue 50 when a vehicle occupant desires to fasten the seatbelt assembly 10 as shown in FIG. 4. Further, the mounting portion 54 of the seatbelt tongue mount 51 is pivotally coupled to a vehicle seat or vehicle, such as vehicle seat 12 or vehicle 15 shown in FIG. 4, at pivot point P₁ for rotational movement in the direction as indicated by arrow C, thereby providing another point of adjustment for the seatbelt tongue mount 51a.

Referring now to FIG. 5B, a cross-section of the translation portion 56 is shown having the mounting portion 54 received therein. As shown in the cross-section of FIG. 5B, the translation portion 56 includes an open channel 57 in which a guide member 55 is received to guide the movement of the translation portion 56 along the mounting portion 54 in the direction as indicated by arrow B in FIG. 5A. It is further contemplated that the cam driver 64 may be a powered cam driver for pushbutton actuation by the vehicle occupant.

Referring now to FIG. 6A, another embodiment of a seatbelt tongue mount 51b is shown having seatbelt tongue 50 disposed on bracket portion 52 which is coupled to mounting portion 54 at a translation portion 56. The seatbelt tongue mount 51b further includes a motor 80 that is coupled to a drive shaft 82, which is shown in FIG. 6A in the form of a threaded member or worm drive. The drive shaft 82 is contemplated to be threadingly received in the guide member 55 of the mounting portion 54 as shown in FIG. 6B. In this way, the guide member 55 acts as a ferrule for moving the seatbelt tongue 50 upwardly and outwardly in the direction as indicated by arrow B between extended and retracted positions. Specifically, the motor 80, as actuated by a vehicle occupant, will rotate the drive shaft 82 causing the seatbelt tongue mount 51b to telescope inwardly or outwardly as indicated by arrow B. Thus, the seatbelt tongue mount 51b is a powered seatbelt tongue mount often referred to as a presenter which includes mounting portion 54 which is received within the translation portion 56 for providing a powered telescoping feature for the seatbelt tongue 50, thereby making the seatbelt tongue mount 51b adjustable to provide greater access to the seatbelt tongue 50 when a vehicle occupant desires to fasten the seatbelt assembly 10 in a manner as shown in FIG. 4.

Referring now to FIG. 6B, the translation portion 56 is shown having the mounting portion 54 received therein. As shown in the cross-section of FIG. 6B, the translation portion 56 includes an open channel 57 in which guide member 55 is received to guide the movement of the translation portion 56 along the mounting portion 54 in the direction as indicated by arrow B in FIG. 6A. As noted above, the drive shaft 82 is threadingly received within a channel 83 of guide member 55. The embodiment shown in FIG. 6B further includes a cover 84 for covering the motor 80 and drive shaft 82 in assembly.

Figure 7A:
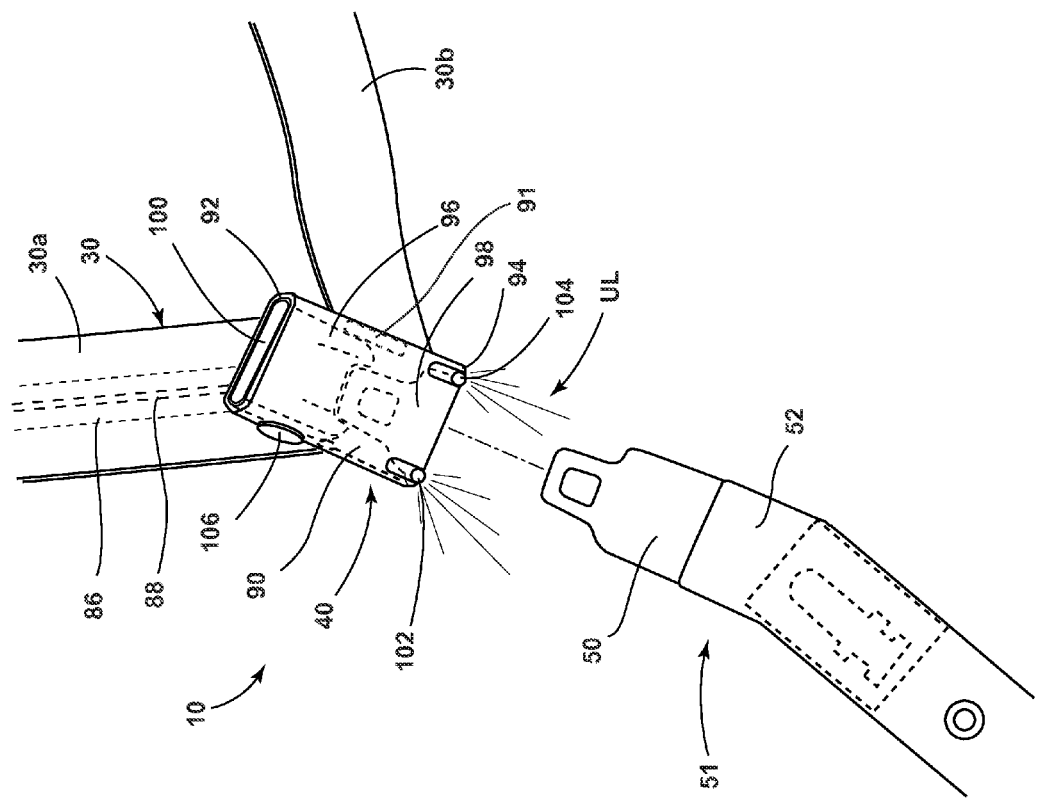
FIG. 7A is a perspective view of a seatbelt assembly in an unlatched condition.
Figure 7B:
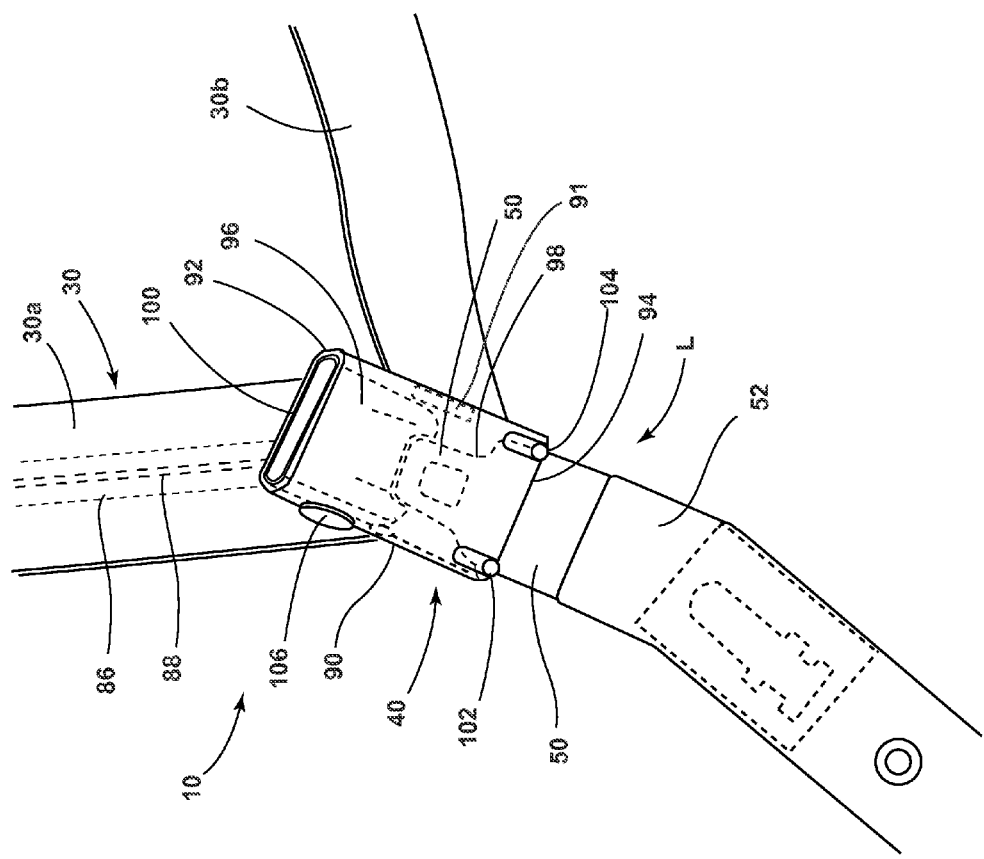
FIG. 7B is a perspective view of the seatbelt assembly of FIG. 7A in a latched condition.

Referring now to FIG. 7A, the seatbelt assembly 10 is shown with the seatbelt buckle 40 disposed between first and second portions 30a, 30b of the belt webbing 30. In the embodiment shown in FIG. 7A, the first portion 30a of the belt webbing 30 includes a passageway 86 which houses a power supply 88 which is used to power the seatbelt buckle 40 as further described below. It is contemplated that the belt webbing 30 is comprised of synthetic yarns which are woven together in such a way as to create a generally centrally disposed passageway, such as passageway 86. The power supply 88 is configured to be received within the passageway 86 and may be in the form of a wire or multiple wires as necessitated by the features of the seatbelt assembly 10.

As further shown in FIG. 7A, the seatbelt buckle 40 includes a housing 90 having an upper side 92 and a lower side 94. The housing 90 includes a latch mechanism 96 which is configured to releasably couple the seatbelt tongue 50 to the seatbelt buckle 40. The seatbelt tongue 50 is received within a cavity portion 98 of the seatbelt buckle 40 which is accessible from the lower side 94 of the seatbelt buckle 40 and shown in phantom in FIG. 7A. The upper side 92 includes a pushbutton actuator 100 which is used to release the seatbelt tongue 50 from the latch mechanism 96 of the seatbelt buckle 40 as further described below. Thus, as shown in FIG. 7A, the seatbelt assembly 10 is in the unlatched condition UL. For latching the seatbelt assembly 10, a user will grasp the seatbelt buckle 40, which is tethered to the vehicle via the belt webbing 30, and pull the retractable webbing 30 outwardly a distance necessary to bring the seatbelt buckle 40 into contact with the seatbelt tongue 50. In this way, the seatbelt buckle 40 and the seatbelt tongue 50 are moveable associated with one another between a latched condition L (FIGS. 4 and 7B) and an unlatched condition UL (FIG. 7A). When maneuvering the seatbelt buckle 40 in poorly lit conditions, the seatbelt assembly 10 of the present invention includes a lighting feature for use in helping the vehicle occupant find the seatbelt tongue 50 which is generally disposed adjacent a vehicle seat. The lighting feature, as shown in FIG. 7A, includes first and second light sources 102, 104 generally disposed near the lower side 94 of the seatbelt buckle 40. The light sources 102, 104 may be powered by the power supply 88 provided in the belt webbing 30 or may be powered by a replaceable battery or power cell 91 disposed within the housing 90. The light sources 102, 104 are further controlled by a power switch 106 disposed along a side of the housing 90 of the seatbelt buckle 40 to selectively provide power to the light sources 102, 104. It is contemplated that the power switch 106 may be a rubberized button which can be pushed to power and illuminate the first and second lights sources 102, 104 for providing a utility light feature for aiding in the fastening of the seatbelt assembly 10. The power switch 106 may be a button which works on-demand, or may be an on/off switch that is activated by a first push and deactivated by a second push. With the power switch 106 disposed along the side of the housing 90 of the seatbelt buckle 40, the user can easily power-on the first and second light sources 102, 104 by grasping the seatbelt buckle 40 around the housing 90. Thus, the power switch 106 is in a convenient location for a vehicle occupant as the vehicle occupant is in the process of fastening the seatbelt assembly 10.

It is contemplated that the first and second light sources 102, 104 may be light emitting diodes (LEDs) which provide a bright light as the seatbelt buckle 40 is maneuvered about the vehicle interior. Further, it is contemplated that the seatbelt tongue 50 is a polished chrome plated member, which is highly reflective and can be easily located using the first and second light sources 102, 104. While the embodiment shown in FIG. 7A includes first and second light sources disposed on a lower side 94 of the seatbelt buckle 40, it is contemplated that the seatbelt buckle 40 may include a single light source, or a plurality of individual light sources as dictated by design and function. Further, it is noted that the second portion 30b of the belt webbing 30 may also house a passage way and power supply similar to passage way 86 and power supply 88 found in the first portion 30a of the belt webbing 30 for providing power to the first and second light sources 102, 104 of the seatbelt buckle 40.

Referring now to FIG. 7B, the seatbelt assembly 10 is shown in the latch condition L as the seatbelt tongue 50 is received in the cavity 98 of the seatbelt buckle 40 and latched to the latch mechanism 96 disposed within the housing 90. It is contemplated that the latch mechanism 96 may comprise any structure capable of cooperating with the seatbelt tongue 50 to releasably latch the seatbelt tongue 50 to the seatbelt buckle 40. Further, the pushbutton actuator 100, may be of any form capable of unlatching or releasing the seatbelt tongue 50 from the latch mechanism 96. As shown in the latched condition L, the seatbelt assembly 10 provides for the seatbelt buckle 40 to have the upper side 92 generally accessibly to the vehicle occupant, such that the pushbutton actuator 100 can easily be reached and actuated to unlatch the seatbelt assembly 10. Further, it is contemplated that the first and second light sources 102, 104 may be automatically programmed to turn off when the seatbelt assembly 10 is in the latched condition L. Thus, it is contemplated that the latching of the seatbelt tongue 50 to the seatbelt buckle 40 may interrupt the power supply 88 to the first and second light sources 102, 104.

Figure 8:
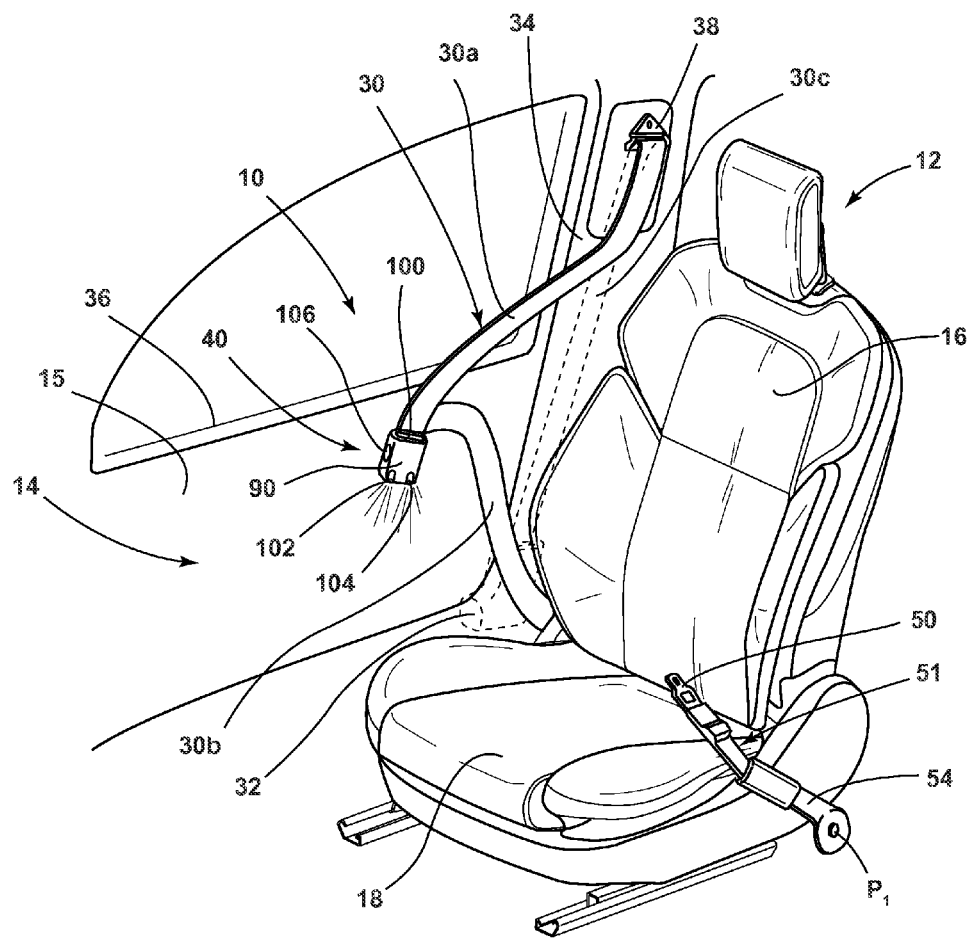
FIG. 8 is a perspective view of the seatbelt assembly of FIG. 3 showing the seatbelt buckle being used as a flashlight within the vehicle interior as tethered to the vehicle via a belt webbing.

Referring now to FIG. 8, the seatbelt assembly 10 is shown in the unlatched condition UL, and the seatbelt buckle 40 is further shown as being moveable about the vehicle interior 14. While the seatbelt buckle 40 is moveable about the vehicle interior 14, the seatbelt buckle 40 remains tethered to the vehicle 15 via the retractable belt webbing 30. As travelling freely about the vehicle interior 14 in the unlatched condition UL, the seatbelt buckle 40 provides a utility light feature using first and second light sources 102, 104 as powered through the belt webbing 30 as described above. In this way, the seatbelt buckle 40 defines a tethered flashlight for use by a vehicle occupant for searching the vehicle interior 14 in poorly lit conditions. Thus, it is contemplated that a user may open the passenger side door 36, retrieve the seatbelt buckle 40 from its retracted location on the B-pillar 34 and pull the seatbelt buckle 40 into the vehicle interior 14 for selectively illuminating portions thereof. As noted above, the user will use the power switch 106 to illuminate the first and second light sources 102, 104 to assist in locating an item within a vehicle interior 14. In this way, the seatbelt assembly 10 of the present invention provides a utility light feature within the seatbelt buckle 40 that is readily accessible and tethered to the vehicle 15 via the belt webbing 30. As noted, the lighting feature of the seatbelt buckle 40 is also useful in helping a vehicle occupant locate the seatbelt tongue 50 and fasten the seatbelt buckle 40 thereto. Thus, with the reverse configuration of the seatbelt assembly 10 of the present invention having the seatbelt buckle 40 coupled to the retractable belt webbing 30 and the seatbelt tongue 50 mounted in a more stationary, yet telescoping position, the seatbelt assembly 10 allows for a lighting feature to be disposed within the housing 90 of the seatbelt buckle 40 while using seatbelt system components with which a vehicle occupant is generally familiar.

Referring now to FIGS. 9A and 9B, two iterations of a seatbelt buckle 40a, 40b are shown at the lower side 94 of the housing 90. In FIG. 9A, the seatbelt buckle 40a includes first and second light sources 102a, 104a disposed on either side of a seatbelt tongue receiving slot 110. As further shown in FIG. 9A, the power switch 106 is disposed on a side portion of the housing 90 for providing power and illuminating first and second light sources 102a, 104a. The seatbelt tongue receiving slot 110 is configured to receive a seatbelt tongue, such as seatbelt tongue 50 shown in FIG. 7A, into the seatbelt buckle 40 for latching to the latch mechanism 96 described above with reference to FIG. 7A. In the embodiment shown in FIG. 9B, the seatbelt buckle 40b includes a total of four LED light sources which make up first and second light sources 102b, 104b. Again, as noted above, the seatbelt buckle 40 may include any number of light sources necessary to properly illuminate the vehicle interior for use as a tethered flashlight. As further shown in FIGS. 9A and 9B, the seatbelt tongue receiving slot 110 is surrounded by a funneling feature 111 which completely surrounds the seatbelt tongue receiving slot 110 and serves as a guide for urging a seatbelt tongue into the seatbelt tongue receiving slot 110. The funneling feature 111 may be comprised of a rigid polymeric material in assembly.

Figure 9C:
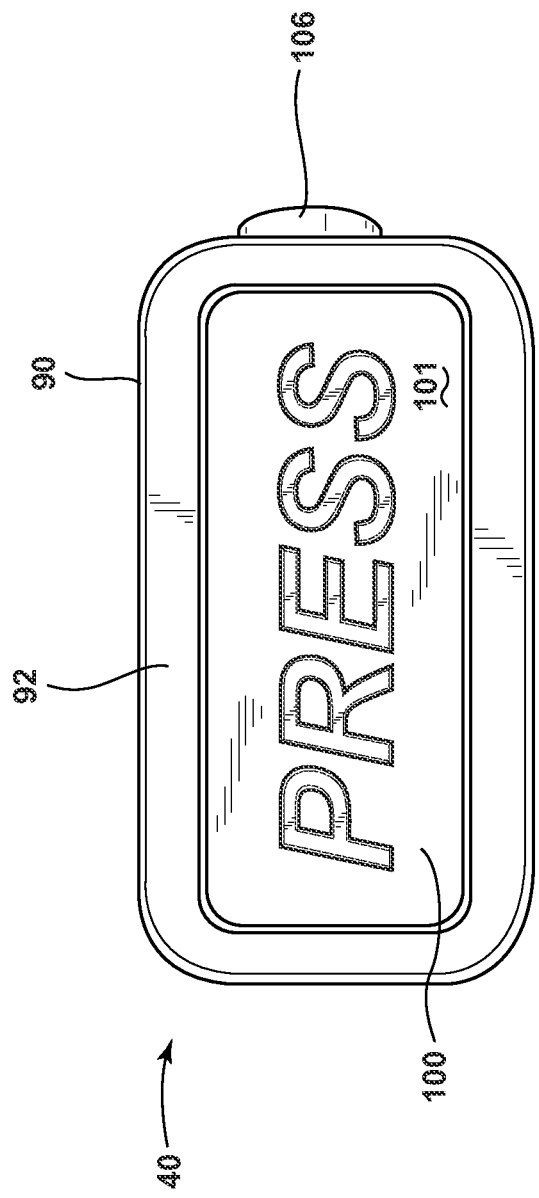
FIG. 9C is a top plan view of a seatbelt buckle according to yet another embodiment.

Referring now to FIG. 9C, the seatbelt buckle 40 is shown from a top plan view with the upper side 92 being shown. The pushbutton actuator 100 is shown having the word "press" molded into an upper facing 101 of the pushbutton actuator 100 which directs the vehicle occupant to press the pushbutton actuator 100 to release the seatbelt buckle 40 from the seatbelt tongue 50 by releasing the latch mechanism disposed within the housing 90 of the seatbelt buckle 40. It is contemplated that the first and second light sources 102, 104, as shown in FIG. 7A, may further illuminate the push button actuator and the wording "press" disposed on the upper facing 101 of the pushbutton actuator 100 when the first and second light sources 102, 104 are activated by power switch 106. With the seatbelt buckle 40 being configured as shown in the embodiment of FIG. 9C, the seatbelt buckle 40 provides an overall ergonomic benefit to a vehicle occupant when latching and unlatching the seatbelt system. These benefits are provided by the shape and size of the seatbelt buckle 40 being generally easier to hold and maneuver than a standard seatbelt tongue coupled to a belt webbing. This is especially true for vehicle occupants having limited dexterity. Further, the push button actuator 100, which is used to release the seatbelt buckle 40 from a latched condition, is more accessible than a conventional release button found on a standard seatbelt system. This is particularly true in that the seatbelt buckle 40 provides unencumbered access to the push button actuator 100 by having the upper facing 101 disposed on the upper side 92 of the housing 90, as shown in FIG. 9C. In this way, a vehicle occupant does not have a buckled seatbelt tongue blocking access to the push button actuator 100, as is generally found in a conventional system. Further, with reference to FIGS. 9A and 9B, the seatbelt tongue receiving slot 110 is centered within the housing 90 and is further provided with the funnel feature 111 for guiding the movement of the seatbelt buckle 40 for proper reception of the seatbelt tongue within the seatbelt tongue receiving slot 110.

With further reference to FIGS. 9A-9C, another benefit of the present seatbelt system is that the seatbelt tongue receiving slot 110 is disposed on the lower side 94 of the housing 90. In a typical seatbelt assembly, the seatbelt tongue receiving slot is disposed on a buckle that is upwardly facing as connected to the vehicle in a configuration similar to that shown in FIG. 2. With an upward facing slot in a conventional system, contaminants, such as food crumbs, liquid from spills, coins and other debris may fall into the seatbelt buckle at the receiving slot and are then very difficult to remove therefrom. With the seatbelt buckle 40 of the present invention, it is difficult for debris to enter the seatbelt buckle and interfere with any of the mechanisms and light sources contained therein. Further, should any debris enter the seatbelt buckle 40 near the release button 100 disposed on the upper side 92 of the housing 90, this debris will likely gravitationally be expelled from the seatbelt buckle 40 when the seatbelt buckle 40 is oriented its usable vertical position.

Figure 10A:
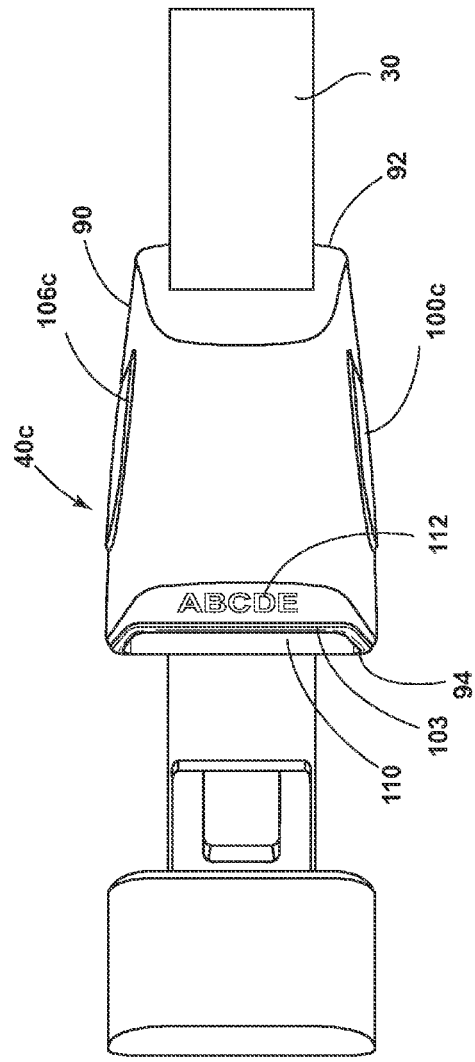
FIG. 10A is a top plan view of a seatbelt buckle according to yet another embodiment.

Referring now to FIG. 10A, another embodiment of the seatbelt buckle 40c is shown having a housing 90 with an upper side 92 and a lower side 94. The lower side 94 includes the seatbelt tongue receiving slot 110 having a light ring 103 disposed around the seatbelt tongue receiving slot 110. The light ring 103 defines a light source for the seatbelt buckle 40c which can be used as a flashlight or as a light source to illuminate a seatbelt tongue when a vehicle occupant wishes to fasten the seatbelt assembly. As further shown in FIG. 10A, an emblem or insignia 112 is disposed adjacent to the lower side 94 of the seatbelt buckle 40c. In the embodiment of FIG. 10A, the emblem reads ABCDE, but would likely have the model or manufacturing name or logo in assembly. Power switch 106c is disposed along a side portion of the housing 90 which is used to illuminate the light ring 103 which is further used to internally illuminate the emblem 112 disposed adjacent thereto. It is contemplated that the light ring 103 is a light guide that propagates light throughout the light ring 103, and is also channeled to internally illuminate the emblem 112 when the power switch 106c is activated. On the opposite side of the housing 90 relative to the power switch 106c is a pushbutton actuator 100c which is used to unlatch a seatbelt tongue from the latch mechanism disposed within the housing 90 of the seatbelt buckle 40c in a manner similar to that described above with reference to push button actuator 100. As further shown in FIG. 10A, the seatbelt buckle 40c is adjustably coupled to the belt webbing 30 which is received in the upper side 92 of housing 90 of the seatbelt buckle 40c.

Figure 10B:
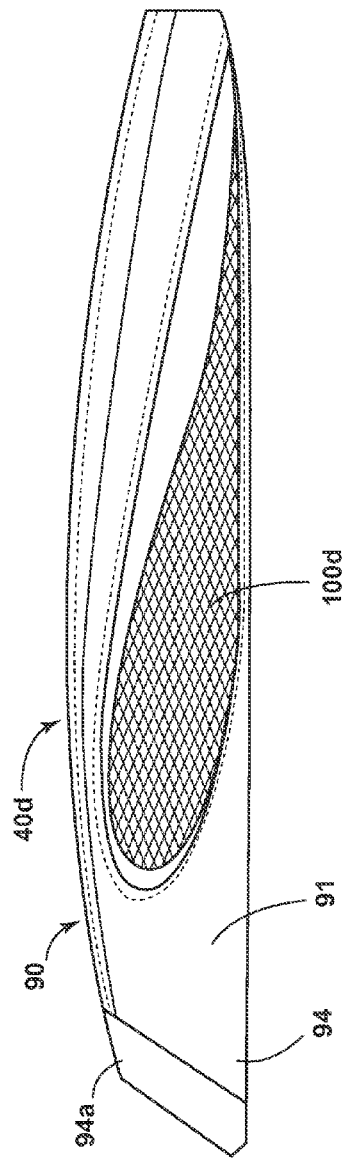
FIG. 10B is a side elevational view of a seatbelt buckle according to yet another embodiment.
Figure 10C:
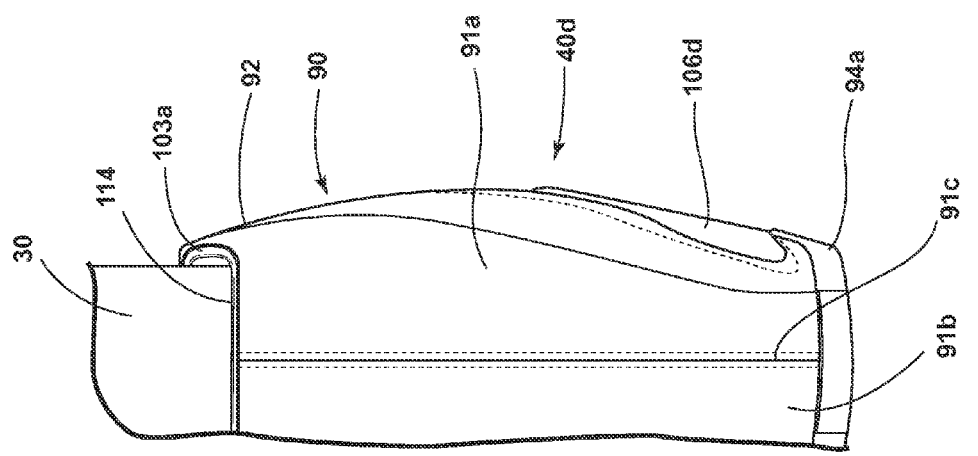
FIG. 10C is a top plan view of the seatbelt buckle assembly shown in FIG. 10B.

Referring now to FIG. 10B, another iteration of the seatbelt buckle 40d is shown, wherein the housing 90 is provided with a leather wrap 91 which includes first and second portions 91a, 91b which are stitched together at seam 91c as shown in FIG. 10C. A pushbutton actuator 100d is shown disposed on a side of the housing 90 having a modernized design for use in unlatching the seatbelt buckle 40d from a seatbelt tongue in a manner as described above. The lower side 94 includes a metallic plated tip 94a where the light ring and slot are generally disposed, such as light ring and slot 103, 110, shown above with reference to FIG. 10A. In FIG. 10C, the upper side 92 of seatbelt buckle 40d includes an upper light ring 103a which is disposed around an upper slot 114 through which the belt webbing 30 is received to couple the seatbelt buckle 40d to the belt webbing 30.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seatbelt assembly, comprising:
   a seatbelt buckle slidably disposed along a retractable belt webbing for movement about a vehicle interior, the seatbelt buckle having a housing containing a latch mechanism which releasably latches a seatbelt tongue to the seatbelt buckle; and
   a light source disposed on an exterior surface the housing for illuminating the vehicle interior as the seatbelt buckle moves thereabout.

2. The seatbelt assembly of claim 1, wherein the seatbelt buckle and the seatbelt tongue are moveably associated with one another between latched and unlatched conditions.

3. The seatbelt assembly of claim 2, including:
   a power cell disposed within the housing of the seatbelt buckle for providing power to the light source.

4. The seatbelt assembly of claim 3, including:
   a power switch disposed on the housing of the seatbelt buckle for selectively powering the light source.

5. The seatbelt assembly of claim 4, wherein the housing includes a pushbutton actuator disposed thereon for releasing the seatbelt tongue from the latch mechanism when the seatbelt buckle and the seatbelt tongue are in the latched condition.

6. The seatbelt assembly of claim 5, wherein the housing includes an upper side and a lower side, and further wherein the pushbutton actuator is disposed on the upper side and the light source is disposed on the lower side.

7. The seatbelt assembly of claim 6, including:
   a seatbelt tongue receiving slot disposed on the lower side of the seatbelt housing.

8. The seatbelt assembly of claim 1, wherein the light source includes a plurality of individual light sources.

9. The seatbelt assembly of claim 1, wherein the seatbelt tongue is disposed on a telescoping seatbelt tongue mount.

10. The seatbelt assembly of claim 9, wherein the telescoping seatbelt tongue mount is a powered seatbelt tongue mount configured to move the seatbelt tongue between extended and retracted positions.

11. The seatbelt assembly of claim 9, wherein the telescoping seatbelt tongue mount includes a lever configured to move the seatbelt tongue between extended and retracted positions.

12. A seatbelt assembly, comprising:
a seatbelt buckle disposed on a belt webbing, the seatbelt buckle having a housing containing a latch mechanism and a light source, wherein the belt webbing defines an extendable tether between the seatbelt buckle and a vehicle for movement about an interior of the vehicle, and further wherein the light source is disposed on an exterior surface of the housing to define a flashlight for providing illumination therefrom; and
a seatbelt tongue operably coupled to the vehicle and configured to be releasably received in the latch mechanism of the seatbelt buckle.

13. The seatbelt assembly of claim 12, wherein the seatbelt buckle and the seatbelt tongue are moveably associated with one another between latched and unlatched conditions, and further wherein the housing includes a pushbutton actuator configured to release the seatbelt tongue from the latch mechanism when the seatbelt buckle and the seatbelt tongue are in the latched condition.

14. The seatbelt assembly of claim 13, including:
a power cell disposed within the housing of the seatbelt buckle for providing power to the light source.

15. The seatbelt assembly of claim 14, including:
a power switch disposed on the housing of the seatbelt buckle for powering the light source.

16. The seatbelt assembly of claim 14, including:
a power supply disposed within the belt webbing for powering the light source of the seatbelt buckle.

17. A seatbelt assembly, comprising:
a seatbelt buckle disposed on a retractable belt webbing for movement about an interior of a vehicle, the seatbelt buckle having a housing containing a latch mechanism;
one or more light sources disposed within the housing for illuminating the vehicle interior;
a telescoping seatbelt tongue coupled to the vehicle and moveable between extended and retracted positions, wherein the seatbelt tongue is releasably received in the latch mechanism.

18. The seatbelt assembly of claim 17, wherein the seatbelt buckle and seatbelt tongue are moveably associated with one another between latched and unlatched conditions, and further wherein the housing includes a pushbutton actuator configured to release the seatbelt tongue from the latch mechanism when the seatbelt buckle and the seatbelt tongue are in the latched condition.

19. The seatbelt assembly of claim 18, including:
a power cell disposed within the housing of the seatbelt buckle for providing power to the one or more light sources.

20. The seatbelt assembly of claim 19, including:
a power switch disposed on the housing of the seatbelt buckle for selectively powering the one or more light sources.

* * * * *